| United States Patent [19] | [11] Patent Number: 4,893,289 |
| Greenwood et al. | [45] Date of Patent: Jan. 9, 1990 |

[54] PRODUCTION OF DIRECTIONALLY LIMITED ACOUSTIC POWER SPECTRA

[76] Inventors: Michael J. Greenwood, Dean Head Farm, Huddersfield Rd., Delph, Oldham; David P. J. Coughtrie, 5 Darwin Grove, Bramhall, Cheshire, both of England

[21] Appl. No.: 165,801

[22] Filed: Mar. 9, 1988

[30] Foreign Application Priority Data

Mar. 21, 1987 [GB] United Kingdom ............... 8706781

[51] Int. Cl.⁴ ............................................. H04D 1/06
[52] U.S. Cl. .................................. 367/136; 367/135; 367/129
[58] Field of Search ............... 367/135, 136, 121–124, 367/103, 105, 129; 340/565, 566

[56] References Cited

U.S. PATENT DOCUMENTS 4,209,853  6/1980  Hyatt ................................. 367/123
4,333,170  6/1982  Mathews et al. ................. 367/122

FOREIGN PATENT DOCUMENTS

2089985  6/1982  United Kingdom.
2127966  4/1984  United Kingdom.

*Primary Examiner*—Thomas H. Tarcza
*Assistant Examiner*—Daniel T. Pihulic
*Attorney, Agent, or Firm*—Kerkam, Stowell, Kondracki & Clarke

[57] ABSTRACT

Apparatus 10 (FIG. 1(a)) for providing acoustic power spectra, all defined over a frequency band from signals received in a predetermined time interval, for individually identifiable directions comprises a pair of arrays 11, 11' of omnidirectional microphone elements 12. The time interval is divided into sampling periods and for each period the microphone signal sampled at 17, digitized at 21 and applied to array sample storage means 27 comprising corresponding shift register $28_1 \ldots 28_N$ for each microphone channel. Previously applied samples are clocked one stage with each new sample so each stage represents a delay of one sampling period. Register stages are connected to nodes 34 of a switching matrix 33, selected by ROM 36 to define the relative delays between samples for each beam direction and those samples read by the matrix are combined to form directed beam samples for that sampling period, stored at 40. At the end of the time interval they are extracted in a set for each beam direction, the samples taken at the succession of sampling periods in the interval being analyzed by FFT circuit 44 to give an acoustic power spectrum for the direction.

20 Claims, 5 Drawing Sheets

PRODUCTION OF DIRECTIONALLY LIMITED ACOUSTIC POWER SPECTRA

This invention relates to the production of acoustic power spectra and in particular to the production of such spectra directionally limited in association with identifiable directions from which sources of acoustic emissions, recognizable by a frequency content or relationship, may be detected in those identifiable directions.

One source of acoustic emissions with which the invention is concerned is a vehicle, such as a helicopter, from which emissions the acoustic power spectrum over a predetermined frequency band may be employed to identify characteristics of the emissions by which the vehicle is detected or indeed identified as to type, and the following description is directed largely towards detection and recognition of a helicopter, although by no means limited to such a source, nor indeed the utilization of acoustic power spectra for detection and recognition.

In military engagements the helicopter has become a powerful weapon because of its speed and maneuverability and the detection in such circumstances of a helicopter at long range, and advantageously determination of other information, such as its direction and type, is of use both to personnel in the engagement and to autonomous weapons developed specifically to attack enemy helicopters.

Long range helicopter detection is permitted by acoustic emissions provided principally by the movements of the rotors through the air and the frequencies associated at least with the main rotor emissions are at the low end of the audible spectrum.

Detection of the presence of an acoustic source, particularly at long range as in the case of a helicopter, is possible by way of defining an acoustic power spectrum in a frequency band including the emissions made by the rotors, and possibly any harmonics thereof, and determining from characteristic frequency relationships within such a spectrum the presence, and possibly type, of helicopter source.

Although providing a power spectrum of the acoustic signals received enables the presence of frequency components and their relationship to be used to identify an appropriate source it will be appreciated that the signal levels may be low and distorted by constantly changing environmental conditions.

Improvement in the provision of such acoustic power spectra depends to some extent upon the requirements of the use to which put. For example, the requirement may be to detect a source at maximum range irrespective of disposition with respect to the apparatus or the requirement may be to detect such source with reference to its bearing direction in a measurement plane, usually an azimuth plane, with respect to the apparatus, the maximisation of detection range being a secondary consideration.

In general it will be seen that detection range may be maximised by concentrating on one direction and excluding possibly conflicting sources from other neighbouring directions so that there are advantages in producing directionally limited acoustic spectra whatever the primary reason for so doing.

To define such direction limitations to signals received it is known to employ an azimuth plane array of microphone elements whose outputs are combined to form a directional response lobe defining a response beam for the array, the direction of the array response being defined by introducing relative delays between the element signals before combining them.

By suitable choice of relative delays different beam directions may be defined thereby and by varying the relative delays as a function of time the response beam direction may be steered through the azimuth plane.

The applicability of the technique of forming a power spectrum from which to detect the presence of a source or otherwise, coupled with the desirability of source direction definition results in a conflict. As stated above in order to detect a source in any one of a plurality of identifiable azimuth directions it is necessary to limit reception to, or at least identify the signals received from, each such direction which is normally achieved by scanning directionally limited detection apparatus through each of the directions in turn.

It is also considered desirable, in order to detect the presence of a source as soon as possible or when emissions may be short lived, for example, explosion related impulses, to monitor emissions from all possible source directions continuously.

However, to form an acoustic power spectrum requires the reception of acoustic signals for a time interval related to the frequency band for which the spectrum is required. In the case of a helicopter which may have a main rotor frequency of the order of 10–15 Hz, the time interval for which signals must be collected will be of the order of 2 seconds.

Thus where comprehensive, that is, continuous, coverage of all directions is required the scanning or stepping of a steerable beam direction through the identifiable angles with respect to the array, at each of which a power spectrum is formed from received signals, will be so time consuming as to fail in this goal.

It has also been found that where the presence of a source emission is detected that the amplitude of the received emission signal may be slowly modulated as a function of time due to variations in atmospheric conditions or other phenomena causing attenuation and/or multi-path signal interference. Such amplitude modulation takes place at a rate which is of the same order of magnitude as the time interval required between direction stepping where such spectra are formed and may lead to a situation where the signal level at a particular frequency and indicative of a source appears to change between adjacently defined directions in accordance with such time varying signal modulation rather than the emission from the source and therefore leads to false indication of the direction in which the source lies. The alternative of taking signals from appropriate microphones to be processed in apparatus duplicated for each direction is impracticably expensive for most, and particularly field, conditions.

The formation of acoustic spectra for a plurality of directions by directionally defined reception lobes is, therefore, seen capable of introducing disadvantages as well as removing them.

In identifying some of the difficulties to be overcome the above outline and following description are essentially limited for simplicity of description to discussion of direction determination in an azimuth plane which provides a commonly required measurement plane in which +o measure direction with respect to the apparatus. It will be appreciated that in general a measurement plane may be defined differently, such as, vertically and providing direction angles which represent elevation angles.

It is an object of the present invention to provide apparatus for producing a plurality of acoustic power spectra, all defined over a predetermined frequency band from acoustic signals received in a predetermined time interval, for individually identifiable directions which mitigates the above mentioned disadvantages.

According to the present invention apparatus for providing a plurality of acoustic power spectra, all defined over a predetermined frequency band from acoustic signals received in a predetermined time interval, for individually identifiable directions comprising an array of microphone elements fixedly disposed with respect to each other substantially in a measurement plane, sampling means operable to define a succession of sampling periods throughout the predetermined time interval and for each sampling period to sample the acoustic signals received by the array elements, array sample storage means having readable storage locations operable to store for each array element each signal sample and the samples of a plurality of immediately preceding sampling periods, directed beam forming means operable to define for each beam direction relative delays between array element signals characteristic of the reception beam direction in terms of the sampling period and storage locations at which the samples have been stored with the appropriate delays and for at least some of the sampling periods read the stored samples at locations corresponding to the relative delays associated with the beam directions and combine the read samples to give directed beam samples associated with the individual sampler periods for each of the beam directions, directed beam sample storage means operable to store directed beam samples to form, for each beam direction, for sampling periods extending over at least a part of the predetermined interval a set of directed beam samples, and analysis means operable at the end of the predetermined interval to determine from each set of directed beam samples the acoustic power spectrum of the signals received from the direction associated with the set.

According to a second aspect of the present invention a method of providing a plurality of acoustic power spectra all defined over a predetermined frequency band from acoustic signals received in a predetermined time interval, for individually identifiable directions, comprising disposing an array of microphone elements substantially in a measurement plane, defining a succession of sampling periods throughout the predetermined time interval and for each sampling the acoustic signals received by the array elements, storing each array element signal sample and the samples of a plurality of immediately preceding sampling periods, defining for each beam direction relative delays between array element signals characteristic of the reception beam direction in terms of the sampling period and storage locations at which the samples have been stored with the appropriate delays and for at least some of the sampling periods combining stored samples read from locations corresponding to the relative delays associated with the beam directions to give directed beam samples for each of the beam directions, storing directed beam samples to form, for each beam direction, for at least a part of the predetermined interval a set of directed beam samples and at the end of the predetermined interval determining from each set of directed beam samples the acoustic power spectrum of the signals received from the direction associated with the set.

Embodiments of the invention will now be described by way of example with reference to the accompanying drawings, in which:

FIG. 1($a$) is a schematic circuit representation of the apparatus according to the present invention illustrating one form of array sample storage means, FIG. 1($b$) is a schematic circuit representation of apparatus according to the invention illustrating an alternative form of array sample storage means, FIG. 2($a$) is a schematic view of a linear array of microphone elements illustrative of the formation of a directional response, FIG. 2($b$) is a schematic representation of a storage matrix of samples taken from the array of FIG. 2($a$) and the formation therefrom of directional responses, FIG. 3($a$) is a schematic plan view of a prefered form of array comprising a pair of orthogonal linear sub-arrays arranged to provide omnidirectional reception in the azimuth measurement plane, FIG. 3($b$) is a schematic plan view of one of the sub-arrays of FIG. 3($a$) illustrating the directional characteristics thereof, FIG. 3($c$) is a plan view of the other sub-array illustrating its use in combination with the sub array of FIG. 3($b$) to resolve directional ambiguities, FIG. 4($a$) is a schematic plan view of a modified form of the array comprising a larger number of linear sub-arrays spatially separated, and FIG. 4($b$) is a plan view of the array of FIG. 4($a$) showing the sub-arrays coincidentally disposed.

The invention is concerned principally with the formation of acoustic power spectra for different directions with respect to the apparatus in a measurement plane.

The orientation of the measurement plane, angular resolution between said directions, number of beams and total angular coverage is a matter of choice depending upon the utilisation. The form of array of microphone elements is also a matter of choice.

As stated above the invention is particularly suited to utilisation in detecting acoustic sources in battlefield conditions in which it is desired to provide reception for 360° in azimuth about the apparatus. Furthermore it is desirable that the directionally limited spectra are defined for signals received in a large number of narrowly defined angular ranges both for angular resolution and to facilitate detection from the spectra of emitting sources at long distances. In such a situation it is desirable to employ an array of microphone elements which is readily deployed and as will be discussed further hereinafter it is advantageous to employ an array which comprises linear sub-arrays of omnidirectional microphone elements, despite directional response forming limitations in such simple sub-arrays which appear contrary to the requirement.

However, to gain an understanding of the invention as to the formation of directionally identifiable acoustic power spectra all defined over a predetermined frequency band from acoustic signals received in a predetermined time interval it is convenient to consider an arrangement including such a simple linear array of microphone elements.

Figure 1A:
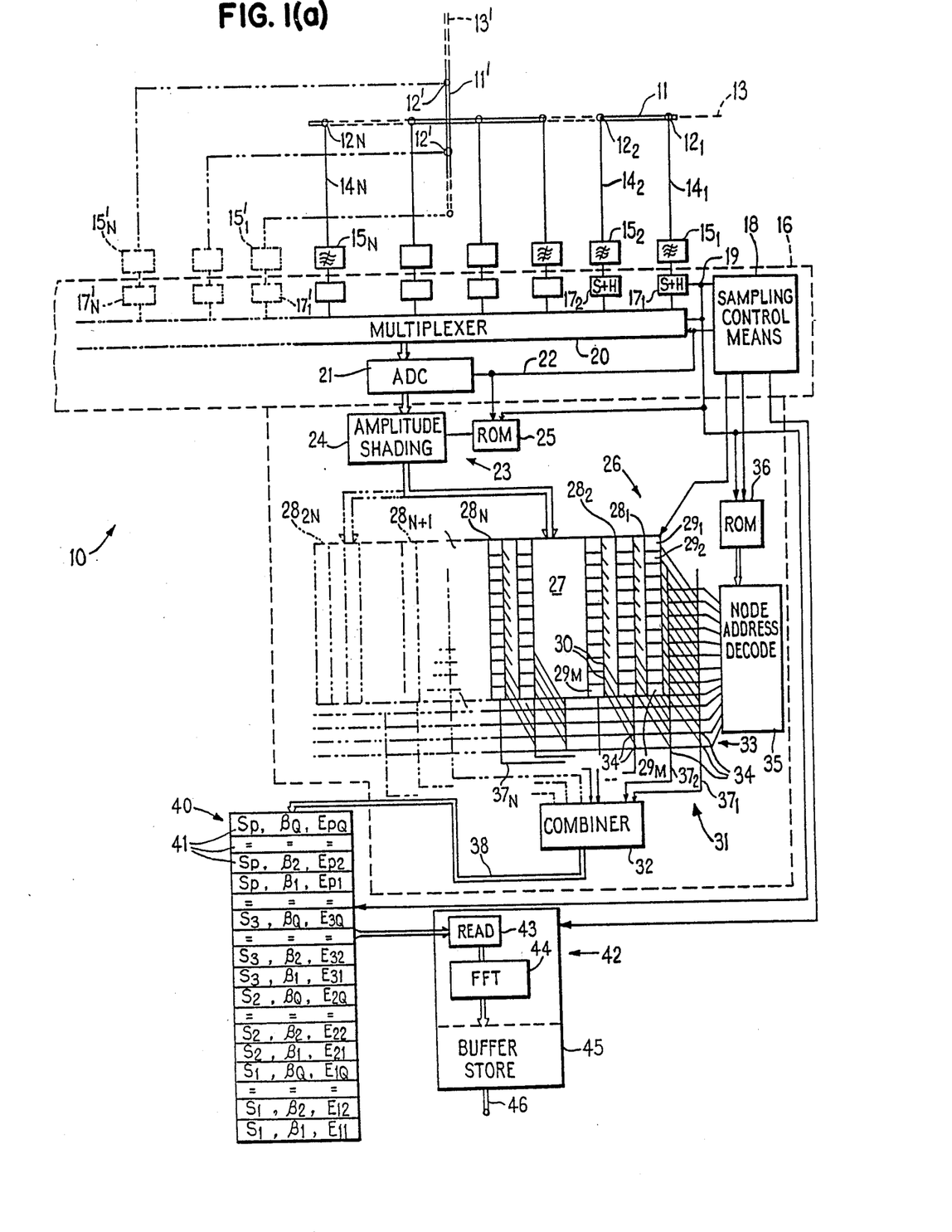

Referring to FIG. 1($a$) apparatus 10 includes a linear array 11 of N omnidirectional microphone elements $12_1$ ... $12_N$ spaced from each other equidistantly along an array axis 13. The spacing between the microphone elements is a function of the frequency band in which the array is to be operated, a particular frequency of the band, for example, a centre frequency, being of the order of half the wavelength to avoid problems of the formation of aliasing lobes for frequencies not of interest.

Each microphone element defines what may be referred to as a microphone channel and provides in response to acoustic energy impinging upon it an electrical signal on a respective channel line $14_1 \ldots 14_N$ whose amplitude is an analogue of the instantaneous acoustic pressure. The microphone elements are each coupled to individual low pass antialiasing filters $15_1 \ldots 15_N$ and thence to sampling means 16. The sampling means comprises sample-and-hold circuits $17_1 \ldots 17_N$ and sampling control means 18 which comprises a timing circuit operable to define certain time intervals and issue timing signals at, and during, these defined intervals to different parts of the apparatus. The sample-and-hold circuits are connected in parallel as regards sample taking and are arranged to respond simultaneously to a signal from the control means on line 19 to sample the level of the microphone element signals on the respective channels. Each sample-and-hold circuit is coupled to multiplexer means 20 which is arranged to connect them sequentially under the control of sampling control means 18 to analog-to-digital conversion (ADC) means 21. The multiplexer and ADC means are clocked by signals from the control means 18 on lines 22 to convert the sampled microphone signals at a rate greater than N times the taking of the samples. The antialiasing filters $15_1 \ldots 15_N$ ensure that frequencies above the level dictated by the sampling theorem are removed to enable the samples digitised to represent truly the microphone signals.

The digital signals, which by their multiplexed formation are each identifiable as relating to a particular microphone channel, are applied to amplitude shading means 23 which is of digital form and arranged to receive the digitised sample signals produced by the ADC means 21.

The use of amplitude shading in beam forming from an array of elements is well known and essentially comprises adjusting the relative amplitudes of signals received from elements at different parts of the array to define a response beam lobe for the array having desired characteristics. As shown the amplitude shading means 23 comprises a sample level adjusting element 24 the level of adjustments being set by a value read from a ROM 25 for each sample, each value in turn being selected by the multiplexing clocking signal on line 22 in synchronism with the channel related sample being digitised, and reset to the start of the sequence by the sample taking signal on line 19.

Thus each microphone element sample as digitised has its level adjusted in accordance with the amplitude shading characteristic stored in the ROM 25. The amplitude shading may comprise Dolph-Chebychev shading which results in a minimum main response lobe width, that is maximum directivity, but with significant side lobes, or may comprise Binomial shading which rejects unwanted side lobes at the expense of an increased main lobe width.

The digitised samples leaving the amplitude shading means 23 are applied to array sample storage means which is shown with directed beam forming means generally at 26.

The array sample storage means 27 comprises, for each of the N microphone channels, sequential store and transfer means in the form of an M-stage shift register $28_1$-$28_N$. Each shift register has an input stage $29_1$ at which is received the digitised sample, transfer stages $29_2$ to $29_M$ and for at least some of the stages an output terminal 30 at which stage contents can be read. Clocking means is provided by the sampling control means 18 which, for each microphone element sample taken, transfers each of the stored samples to a succeeding stage and causes the newly taken and digitised sample to be applied to the input stage. The shift register of a particular microphone channel will thus be seen to hold sample representations for the current and preceding M-1 sampling periods and the sample read from any stage output represents the sample delayed by an interval, being an integral number of sample periods, corresponding to the location of the stage in the shift register.

For the N microphone channels the N shift registers $28_1$ to $28_N$ are connected to be clocked in parallel.

The directed beam forming means, shown at 31 is operable to define each beam direction in terms of relative delays between array element signal samples which are characteristic of the beam directions relative to the array.

The relative delays are in practice defined by selection of storage stage outputs and for any beam direction the stage contents read from the appropriate stage outputs are combined in a combiner or accumulator 32 to derive a directed beam sample for that beam direction.

The beam forming means 31 comprises a switching matrix 33 providing M×N switching nodes 34, to which the shift register outputs 30 represent inputs, switching node address decoder 35 and ROM 36. The switching matrix has N output lines $37_1$ to $37_N$, one for each microphone channel. Each of the N lines of the switching matrix thus has M switching nodes any one of which may be energised, or addressed, by a matrix addressing input to connect an appropriate output of any shift register to the corresponding matrix output line and define the duration of delay a signal from the appropriate shift register stage has undergone before its application to the combining means 32.

The 1-out-of-M switching node selection for each of the N microphone channels is controlled by the address decoder 35 under the control of ROM 36 which contains a set of matrix switching node configurations, one for each beam direction, each configuration relating to the respective channels the delay element taps, and thus the delays, necessary to define a particular beam direction.

The ROM 36 is controlled by the signal on line 19 from the sampling control means 18 to commence selection of the whole set or any desired combination of matrix configurations each time an input signal sample is taken at 17 and to sequence through the configurations, to define all the beam directions desired to be identified.

The combining means 32 of the beam forming means produces a representation or record of the sum of the amplitude-shaded microphone samples, with appropriate delays, which representation may be considered as the level, that is, the acoustic pressure of, a directed beam sample. The output of combining means 32 is applied on line 38 to directed beam sample storage means 40.

The directed beam sample storage means 40 has a number of record storage locations, represented at 41, and is operable under control of sampling control means 18 to store successively produced directed beam sample records which are subsequently read by, and utilised in, analysis means 42.

The analysis means 42, which also operates under the control of sampling control means 18, contains means 43 to read data from storage means 40, a Fast Fourier Transform (FFT) arrangement 44 which effects production in digital form of the data of an acoustic power spectrum and a buffer storage zone 45 to store such spectral data until required and accessed via output line 46.

It is known to produce an acoustic power spectrum function for a predetermined frequency band by defining a time interval (as a function of the lowest frequency of the band) over which acoustic signals are received and for that interval sampling the acoustic signal level periodically (at a rate determined by the highest frequency of the band), converting the signal samples to digital form and storing them until the end of the interval, thereafter taking the stored set of samples and performing a Fast Fourier Transform operation to define a set of spot frequencies in the band and for each spot frequency a power spectrum function coefficient. Such a digitally defined acoustic power spectrum is of use in many forms of processing, based upon the frequency distribution of the coefficient values within the spectrum, as outlined above.

The principles by which the apparatus 10 functions and by which dimensions and time periods are chosen may be explained with reference to FIGS. 2(a) and (b).

Figure 1B:
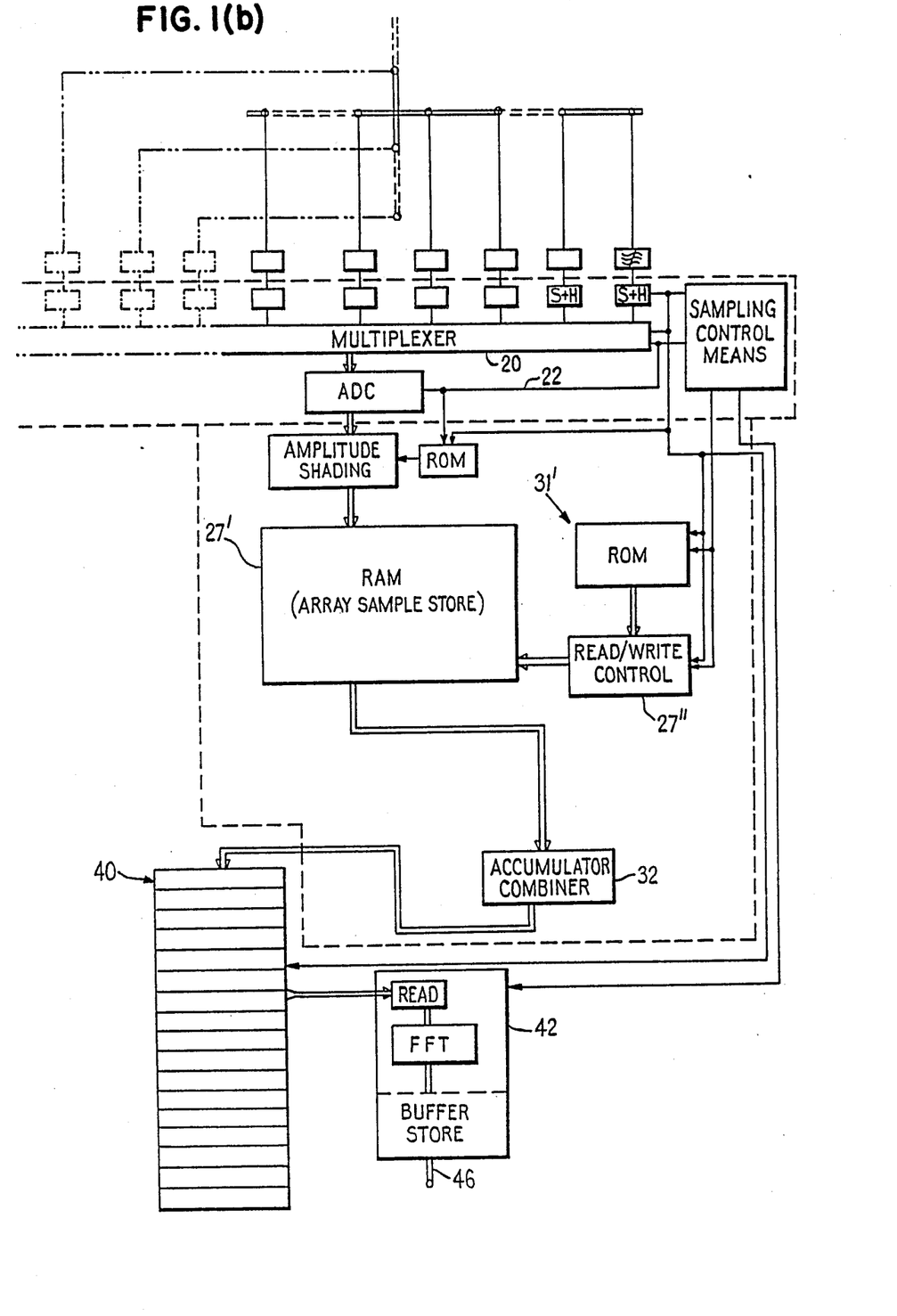
Figure 2A:
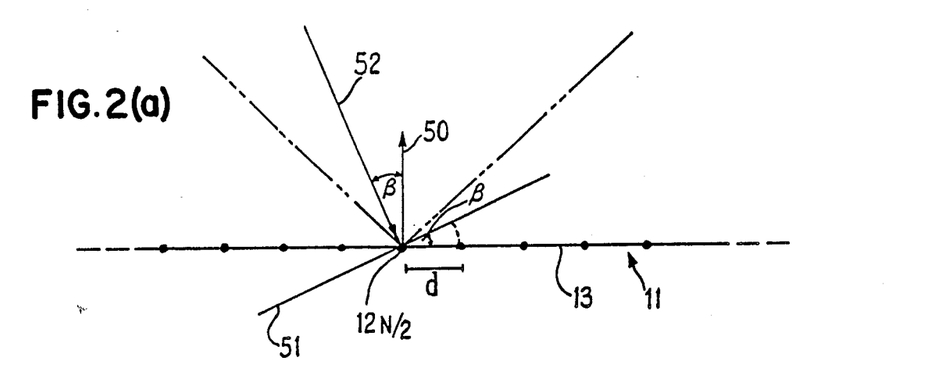
Figure 2B:
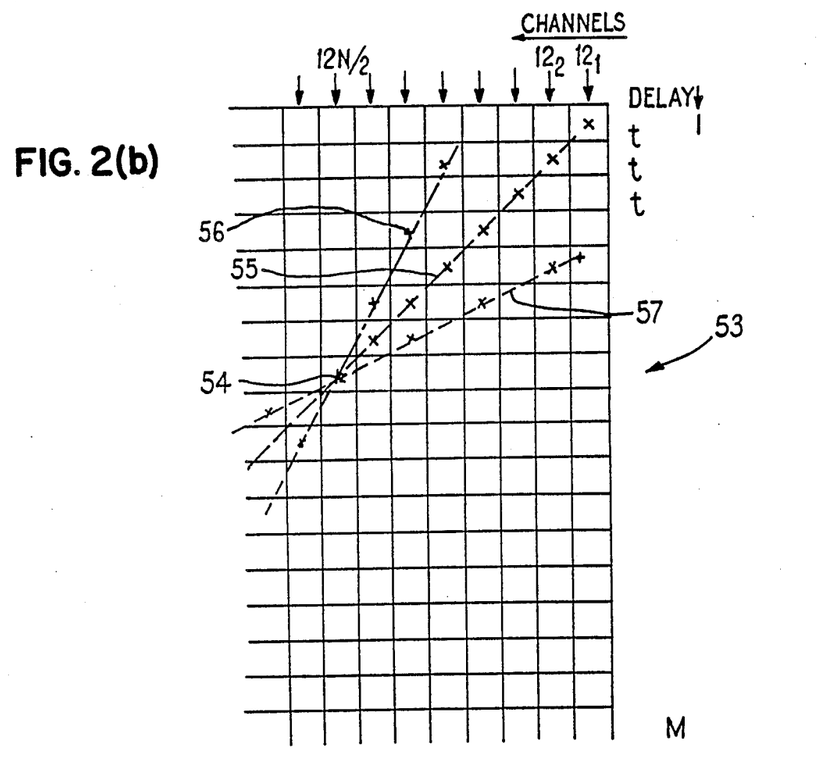

FIG. 2(a) shows the microphone array 11 of FIG. 1 comprising omnidirectional elements $12_1 \ldots 12_N$ disposed along array axis 13 at uniform separation distance d. The diagram shows also a normal 50 to the array axis drawn from the centre element of the array $12_{N/2}$ and a planar acoustic wave front 51 impinging on the array from a direction, shown by arrow 52, making an angle a to the normal.

The element spacing d is chosen in accordance with common design criterion to be of the order of half the wavelength of interest for a source, for example, the mid-point of a band of frequencies in which one or more sources of interest are known to emit.

Also it is well known and can be seen from FIG. 2(a) that for a wavefront approaching at velocity c the time delay t between the wavefront at angle $\beta$ impinging upon successive elements is given by $$t = (d \sin \beta)/c \quad (1)$$

which may be rearranged to give $$\beta = \sin^{-1}(c.t/d) \quad (2)$$

As will become clear, the accuracy by which angular directions such as a can be defined with respect to the array normal varies for different notional directions and in accordance with the invention a specific value of $\beta$, say $\beta'$, is chosen as a representative direction between the limiting values of $\beta$.

For the chosen value $\beta = \beta'$ the delay time t is determined in accordance with equation (1).

Referring now to FIG. 2(b) this shows a schematic storage matrix 53 corresponding to the array sample storage means 27. In particular, the matrix comprises N columns, each corresponding to one of the microphone channel shift registers of the delay means, and M rows corresponding to the stages of the shift registers. Samples from the microphone signals are taken and entered with a sample period corresponding to the value of t defined as above in accordance with equation (1) and shifted between rows at the same rate, each row thereby representing the signal of a preceding row of a microphone channel delayed by a time t.

It is convenient to consider the definition of beam direction with respect to the centre microphone $12_{N/2}$, that is, the $N/2^{th}$ column of the array and also with respect to the $N/2^{th}$ row, the matrix location being denoted by asterisk 54.

It will be appreciated that by addressing the samples in the matrix locations through which the broken line 55 passes and summing them that the reception times of the samples differ from each other by a time delay t such that the combined signal represents a directional response from chosen angle $\beta'$.

It will further be appreciated that other such lines may be defined through the matrix such as shown at 56 and 57.

It will be seen that steeper lines 55 are drawn through matrix locations which although representing adjacent microphone channels are spaced apart by a multiple of t and define from equation (2) values of a greater than $\beta'$.

Shallower lines 57 are drawn through matrix location which represents either successive time delays but non-contiguous microphone channels or (theoretically) through adjacent microphone channels but delays representing a fraction of t.

To provide a sufficient number of samples to form an adequately defined beam in the direction associated with such shallower lines 57 the values of samples at the stages forming delays closest to the required delays may be taken or the samples of adjacent stages to with the required delays may be interpolated to give a sample values approximating to those which could be expected at the delay values but for which no corresponding stages exist.

In practice it is preferred to define the matrix with a larger number of rows, taking samples and shifting them between rows with a sampling period t' which is a fraction of t, said angles smaller than $\beta'$ being defined by equation (2) using the now available fractional values of t represented by t' and its multiples.

However, because the value of t employed in the equation is an integral number of the actual sampling periods t' or is the basic interval t, the value of $\beta$ defined will not be in uniform increments in relation to angle $\beta'$, the departure from step equality being essentially a function of displacement from $\beta'$.

The values of $\beta$ which can be defined are therefore functions of the time delay t (or multiples of t') defined and used as the sampling period, and the angular resolution depends upon the sampling period, the penalty for high resolution being a larger number of rows of the storage matrix.

In the apparatus 10, the sampling control means 18 comprises a timing circuit defining both the limits of a time interval over which the microphone signals are sampled to form such a spectrum and within it a plurality of P sample periods, corresponding to t', at each of which the samples are taken by providing signals on line 19 to the sample-and-hold circuits $17_1 \ldots 17_N$. Within the sample period each such sample in turn is applied via the multiplexer means 20 to the ADC 21 and a representation of the sample applied by way of the amplitude shading means 23 to the input stage $29_1$ of the shift register of the corresponding microphone channel. Sample representations already applied to the shift register are shifted along one stage to accommodate the latest sample and the oldest stored sample, shifted from the Mth stage, is lost.

It is assumed that such sample forming is continuous and that at the start of a time interval the shift registers are filled with previously taken samples and/or that the predetermined interval over which samples are taken exceeds the number of sampling periods for which directed beam samples are formed by at least the total period of the number of samples stored in a shift register.

Each of the shift registers $28_1$ to $28_N$, which have a direct correspondence with the notional storage matrix of FIG. 2(b), is therefore clocked at the sampling rate, that is, once per sampling period, such that for each microphone channel, the input stage contains a representation of the most recent sample with succeeding stages representations of preceding samples until stage M contains sample of M sample periods ago.

The directed beam forming means 31 is also triggered by the sampling control means 18 and may operate such that for each beam direction to be defined in turn the ROM 36 addresses (via decoder 25) the switching matrix 33 and samples from the shift register means, with their relative delays represented by the stage locations, are applied to, and summed in, the combining means 32.

The representation or record of the signal samples combined for that beam direction, the effective directed beam sample, is applied to a location 41 of the directed beam sample storage means 40 tagged, or otherwise identified, not only with the magnitude of the received acoustic energy for that beam direction, but also with the angle (or other function) of the beam direction defined and the number (or equivalent) of the sampling period within the time interval. Conveniently, such a tagged record may be represented in the form $[S_i, \beta_j, E_{ij}]$ where $S_i$ is the sample number, i being between 1 and the total number P of samples taken in the time interval, $\beta_j$ is the beam direction with respect to the normal to the array axis, where j is a number between 1 and Q possible defined bearing directions of the beam, and $E_{ij}$ is the acoustic pressure of the defined beam sample for specific values of i and j.

The records are conveniently stored in the order formed, that is, in sample number order and for each sample in beam direction order, being so illustrated in the locations 41 of store 40 in FIG. 1.

At the end of the time interval, when a further P−1 samples have been taken, and, for each sample, records have been produced for each of the Q beam directions, the sampling control means 18 instructs the analysis means 42 to read the stored records in beam direction order. That is, for beam direction $\beta_1$ the records tagged with this direction are read from the storage means and applied to the FFT means where an acoustic power spectrum function is formed, as indicated above, as a set of function coefficients each associated with a frequency value of the spectrum, the spectrum function then being stored at 45. The records tagged with beam direction $\beta_2$ are then read from the storage means and similarly processed, this procedure being continued until the records associated with all Q beam directions have been processed.

It will be seen that although the acoustic power spectra for the Q directions are produced sequentially from the stored records, the sample levels of corresponding directional records have been taken simultaneously and all the spectra are thus formed on the basis of the same received signals.

The FFT means 44 may produce each directionally related spectrum in sequence by serially reading the records from store 40. If desired the store and reading means could be arranged to access all stored data simultaneously and to form all the FFT's in parallel. Alternatively some only of the FFT's may be formed in parallel providing a sequence of such parallel-formed spectra.

It will be appreciated that the circuit functions provided after conversion of the samples to digital form may be readily performed with alternative forms of array sample storage means and directed beam forming means.

For instance, and as shown in FIG. 1(b), the array sample storage means 27' may comprise for each array element, that is, for each of the N microphone channels, a random access memory (RAM) conveniently within a larger memory incorporating the memory for all channels.

Each RAM is organised as a plurality of M storage locations corresponding to the shift register stages of FIG. 1(a) and each identified by the address of the location for writing the sample data into and reading it from the memory. Read/write control means 27" operates under the control of the sampling means 18 to transfer the stored contents between successive addressed locations to effect the shifting/delaying of the shift register. The beam forming means 31' operates to define each beam direction as a group of RAM address, one from each microphone channel, to be read by the read/write means 27'", the contents of the addressed locations of the group being accumulated in the equivalent of combining means 32 to form a directed beam sample.

The arrangement operates in basically the same way as that of FIG. 1(a) in forming directed beam samples for each of the beam directions for each microphone sample taken and added to the memory.

It will also be appreciated that instead of digitising the samples prior to storing in an array sample store comprising digital memory locations or shift register stages the samples may be processed up to forming directed beam samples in analog form utilising charge coupled devices or the like as the sequential store and transfer means. Such means may be considered as corresponding to the shift register arrangement shown in FIG. 1(a), being similarly addressed to select samples for combining into a directed beam sample before converting to digital form for storage in the directed beam sample storage means and subsequent analysis.

It will be appreciated that in forming a power spectrum of the input signal samples for any beam direction the number of samples required by the FFT means 44 is a function of the frequency band of interest and may be less than the number of samples made available throughout the timing interval by the sampling period value, the latter being determined as described above to provide a sufficient number of samples for defining beam direction.

It is therefore possible, and indeed preferable where a large number of samples are taken to facilitate beam forming, to store fewer directed beam samples than can be derived for all sample periods of a timing interval.

Directed beam samples may be stored, say, for every nth array sample taken, by simply discarding those intervening (n−1) directed beam samples formed or by synchronising the formation of directed beam samples with array sampling/sample shifting so that the directed beam samples are only formed by the beam forming means for every nth array sample taken.

In this latter approach all the directed beam samples are formed from the same two dimensional array of stored array samples in the storage means but alternatively 1/n of the directed beam samples, that is, those associated with 1/n of the beam directions, may be formed in every sample period, thereby spreading the formation of directed beam samples through n sample periods.

It will be appreciated that where the array sampling means comprises sequential store and transfer means, that is, a shift register or the equivalent, for each microphone channel not all of the register stages will be read to define the various beam directions. Accordingly, not every register stage need have an output connected to a switching matrix node, although such an arrangement may provide greater constructional complication than a direct correspondence between all register stages and switching nodes addressed electrically by the instructions of ROM 36.

Although a single set of such spectra may be generated for all the beam directions from the acoustic signals received within the single time interval, it may be required to form such a set of direction-related spectra for a succession of time intervals and by performing the analysis within the duration of a time interval such production of spectra sets may be effected in real time and for contiguous time intervals to give continuous acoustic monitoring in all Q directions.

Such continuous operation is effected essentially as described above, the input signal samples being taken on a continuing basis and each time interval defined by the forming of P (or appropriate smaller number)×Q records and the commencement of record analysis. It will be appreciated that although it becomes necessary to store records for part of two contiguous time intervals, records being both formed and stored and read for analysis in any time interval, directed beam sample storage means 40 may be operated without any significant increase in capacity by storing records formed in a subsequent time interval in locations vacated by records of the preceding time interval read by the analysis means, provided the store data is read at least at the same rate as new records are formed.

To prevent those records stored in the current time interval from being read with those of the preceding time interval as beam direction tags are identified, a further binary tag may be employed to alternate between, and distinguish, the records of successive time intervals.

Although FIG. 1(a) illustrates how for a first time interval the directed beam sample records may be stored neatly in the chronological order of formation in accordance with sample period number they are read in accordance with beam direction angle and the locations vacated filled in accordance with sample number and then beam direction. Accordingly the directed beam sample store contents rapidly become distributed in a non-uniform manner but are easily read by identification of the D and S tags.

It will be appreciated that the accessing of tagged data almost randomly distributed throughout the storage means may take longer than for the regularly disposed records shown in the Figure and as an alternative form of storage means (not shown) two such stores may be employed accepting records in pre-defined locations and having them read in alternate time intervals.

Although the above description of apparatus 10 and its operation provides an understanding of the provision of a set of direction-related spectra for the, or each, time interval defined it will be appreciated that the simple linear form of array shown has serious drawbacks for use in a source detection apparatus. Various array configurations are known extending two dimensionally in a measurement plane which enable microphone signals to be combined in such a way that beamforming may be effected without ambiguity of beam direction within the measurement plane.

In deciding upon the form of array to employ consideration must be given to operating conditions. For example, in battlefield conditions where ruggedness and ease of deployment are important the linear array is advantageous and may be formed as a flexible 'string' of microphone elements simply laid on the ground. However although the linear array format is convenient for practical deployment and for gaining an understanding of the operation of the invention it will be appreciated that for such an array of omnidirectional microphone elements a directional response beam, defined by virtue of establishing uniform signal delays between the elements, has two main directional lobes symmetrically disposed about the array axis 13 thereby introducing an ambiguity as to the direction with respect to the array of a source detected with such a directionally defined response beam.

The simple linear array such as 11 has further disadvantages in that the width of directional response lobes increase with angular departure from the normal, that is, as a function of $\beta$, so that the defining source direction becomes increasingly difficult for angles approaching ±90° from the normal. Furthermore, the response directions defined by the delay intervals in the beam forming means are related to the sampling period and at values departing significantly from the nominal direction (for which the delay period is chosen) the direction steps become large and irregular. Thus where the identifiable directions for the spectra are desired to extend throughout the measurement plane i.e. omnidirectionally but with the individual directed beams being narrowly resolved conventional criteria for choosing an array configuration are against the use of a linear array form notwithstanding its deployment advantages.

However, in accordance with the invention and the techniques adopted in beam forming to derive directional spectra, an array may be advantageously defined by using two or more linear sub-arrays of microphone elements disposed at predetermined angles to each other and defining thereby a measurement plane.

It is convenient, but not essential, to use two sub-arrays and for them to be disposed orthogonally to each other. For further convenience the sub-arrays may be superimposed so that the centres thereof are coincident.

Referring to FIG. 1(a) the array 11 comprises one of such a pair of orthogonal sub-arrays and sub-array 11', of elements 12', the other. These sub-arrays and their relative dispositions are shown schematically in FIG. 3(a).

Figure 3A:
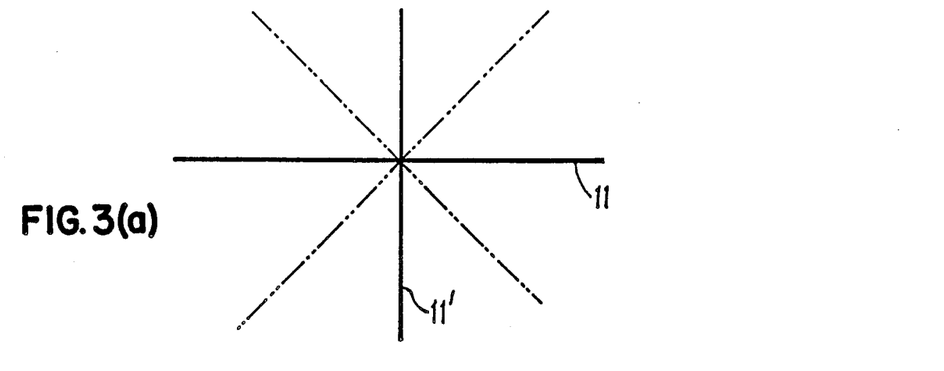

The sub-arrays are operated together substantially as described above for the simple linear array except that the angular ranges of narrowly defined beam directions for each array is limited by the beamforming means to ±45° from the normal to each sub-array. Because of the direction ambiguity associated with a linear array the angular range of beam directions is of course mirrored about the axis of each sub-array.

It will be seen from FIG. 3(a) that the two sub-array angular ranges of definable directions, the boundaries of which are substantially coincident, complement each other and define beam directions through 360° in the measurement plane, subject of course to the resolution of ambiguity. This may be better seen by reference to FIGS. 3(b) and 3(c) which shows the linear sub-arrays 11 and 11' spatially separated and with the regions for which directed beams are not defined, as outlined above, marked by hatching lines.

The signals from each array may be processed as described above independently, either sequentially or in parallel, to define power spectra for all azimuth directions.

It will be appreciated that by limiting the angular range of beam directions with respect to the normal to each sub-array the directed beams may be more narrowly defined, that is, have high directionality, as described above. Furthermore the number of directed beams defined for each sub-array and for which directed beam samples have to be formed and stored are fewer, or permit higher directionality with no increase of capacity.

Figure 3B:
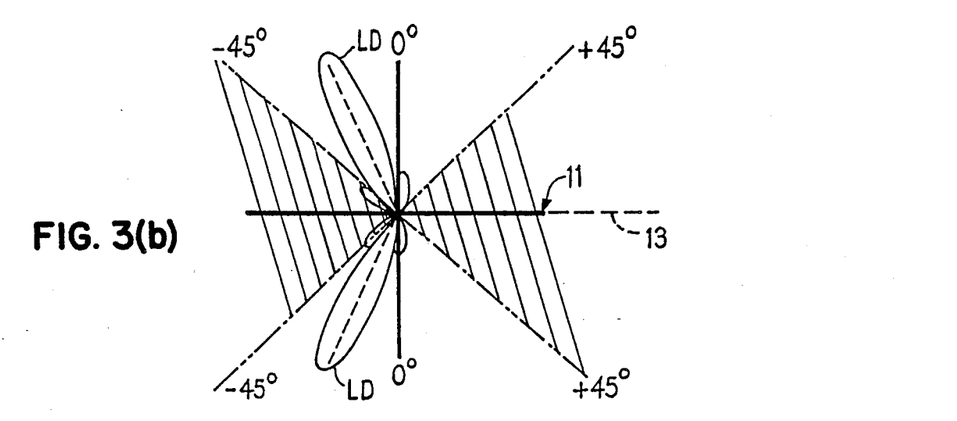

Considering directional ambiguity of reception beams with respect to the axis of each sub-array, FIG. 3(b) illustrates at LD the form taken by the directional response lobes formed at a particular angle with respect to the normal within the range ±45° from the normal to the sub-array axis 13.

Figure 3C:
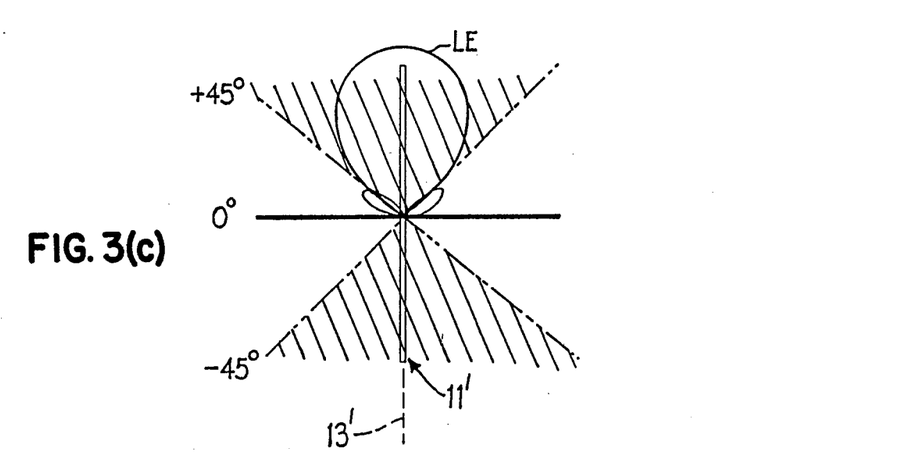

To resolve this ambiguity for each sub-array, say sub-array 11, the other sub-array, 11', is operated also in the so-called end-fire mode wherein the signals are combined from microphone elements 12' spaced apart by the distance such that the ratio of distance to time delay between a wavefront, at the frequency band of interest in forming the spectra, travelling along the sub-array axis 13' is substantially equal to the velocity of the acoustic wavefront and the number of microphone elements employed to provide the response lobe is preferably chosen to define a lobe width LE extending for ±45° with respect to the sub-array axis.

As the signals from the sub-arrays are processed to complement each other the sub-array 11 will also be required to receive in the same end-fire mode for sub-array 11'. Therefore, in addition to defining directed beam samples the beam defining means defines a directed beam sample for each direction of end-fire reception and with component sample delays which give an end fire beam width of some ±45°.

The end-fire directed beam samples are stored in storage means 40 and a suitable acoustic spectrum produced for each by the analysis means after the timing interval is over.

The end-fire spectra produced for each array may be used with the directional spectra of the other array in any suitable manner to resolve directional ambiguity, the advantage of the arrangement being that with minimal additional processing capacity, namely producing, storing and analysing directed beam samples for two end-fire directions, the directed beam samples in a range of ±45° from the sub-array normal cover a region of 180° in the measurement plane.

This form of array configuration may be used advantageously in apparatus for detecting acoustic emissions from objects by analysis of the acoustic spectra formed over a frequency band of interest by the apparatus of FIG. 1(a) or 1(b).

As each directionally related spectrum is produced for the identifiable directions defined in relation to the normal of each array those spectra are analysed for the occurrance of emissions at frequencies, or with frequency relationships, indicative of a particular source, such as a helicopter, desired to be detected. If in any spectrum of one array such a detection occurs the two end-fire spectra of the other sub-array are examined at one or more frequencies of, or involved in, the detection for corresponding components and the end-fire spectrum yielding the strongest level is taken to indicate which side of the first array axis the source lies and therefore its unambiguous direction with respect to the apparatus in the measurement plane.

Referring again to FIG. 1(a) the array 11 of microphone elements $12_1 \ldots 12_N$ forms a sub-array with orthogonal sub-array 11' of microphone elements $12'_1 \ldots 12'_N$.

The microphone elements 12' of the second array are conveniently disposed with the same separation as elements 12 and the microphone signals on further microphone channels with corresponding further filters $15'_1 \ldots 15'_N$ and sample and hold circuits $17'_1 \ldots 17'_N$. The multiplexer 20 is extended to receive inputs from the further microphone channels and this and ADC 21 are driven at a suitable rate to accommodate 2N samples in each sampling period. Within the array sample storage means 27 the number of shift registers forming the sequential store and transfer means is increased to 2N with the addition of $28_{N+1} \ldots 28_{2N}$ and the switching matrix 33 is also extended, the switching nodes addressed of the further part defining corresponding beam directions in relation to the normal to the array 11' as those defined in relation to the normal to array 11. The ROM 36 additionally defines matrix addresses representing definitions of the four end-fire beam directions.

In defining a particular beam direction the directional response lobes of the two arrays may be formed sequentially by accessing the matrix nodes of the two shift register sets $28_1 \ldots 28_N$ or $28_{N+1} \ldots 28_{2N}$ sequentially, and possibly alternately, in which case a single combining means 32 is suitable. Alternatively, the switching matrix may be addressed just once, whereby directional beams are formed for both shift register sets simultaneously, requiring a second combining means 32 (not shown) to form both directed beam samples.

The arrangement of array sample storage means and beam forming means shown in FIG. 1(b) may also be readily adapted to accommodate the extra samples of the more complex array by a suitably increased number of addressable storage locations and stored groups of addresses to define the locations.

It will be appreciated that other modifications may be made as to the particular constructions of parts of the apparatus whilst enabling it to function in accordance with the present invention.

It will be appreciated that the invention is not limited by the form of the microphone element array, that described above being one example. Formations of arrays of elements to provide suitable response beam directions are well known and any may be employed wherein signals or samples from each element may be delayed relative to others before combination to define a unique beam direction.

The amplitude shading means may be performed by amplitude control means in each microphone channel, disposed anywhere between the microphone elements and the combining means 32, the form of the signal or sample level control means depending upon whether the signals or samples thereof are in analog or digital form. Also, the signal samples from each sample and hold circuit 17 may be converted to digital form by individual ADC's, replacing the multiplexing means 20.

The spectra produced in each time interval may be used in a source recognition or identification process as outlined above in which each spectrum is examined for characteristic features, such as relationships between frequencies at which peak energy values occur, which characteristics or relationships are compared with those of a library of such characteristics of known sources, thereby enabling the detection and identification of the source to be acknowledged. Having identified a source by these characteristics others typical of the source may be found and monitored over a period of time, that is a plurality of time intervals, to deduce further information as to the behaviour of the identified source. In the particular case of helicopter detection for which the invention is suited, the characteristic relationship between frequencies of a particular directionally limited spectrum may be that of the ratio between main and tail rotor frequencies, said ratio being unaffected by variations in the actual frequency values due to doppler shift etc. Source detection or the use of directionally limited acoustic power spectra derived according to the invention is not, of course, limited to such helicopter detection.

The two sub-arrays 11 and 11' disposed orthogonally and coincidentally have been described with each providing complementary directional response beam within equal angular ranges. It will be appreciated that within a situation where an acoustically emissive source is detailed at distances and in relation to the dimensions of the array the sub-array may be located close to each other but not necessarily convenient, for example, in an L-shape rather than cruciform.

Similarly they may be inclined other than orthogonally although the beam-width advantages of defining directional beams close to the normal of each linear array is compromised.

For greater accuracy by defining beams only within a narrow range of angles to each side of the normal, or possibly reduce the number of sample intervals and number of array samples stored, a larger number of linear arrays may be inclined to each other and directed beams formed for each over a restricted angle.

Figure 4A:
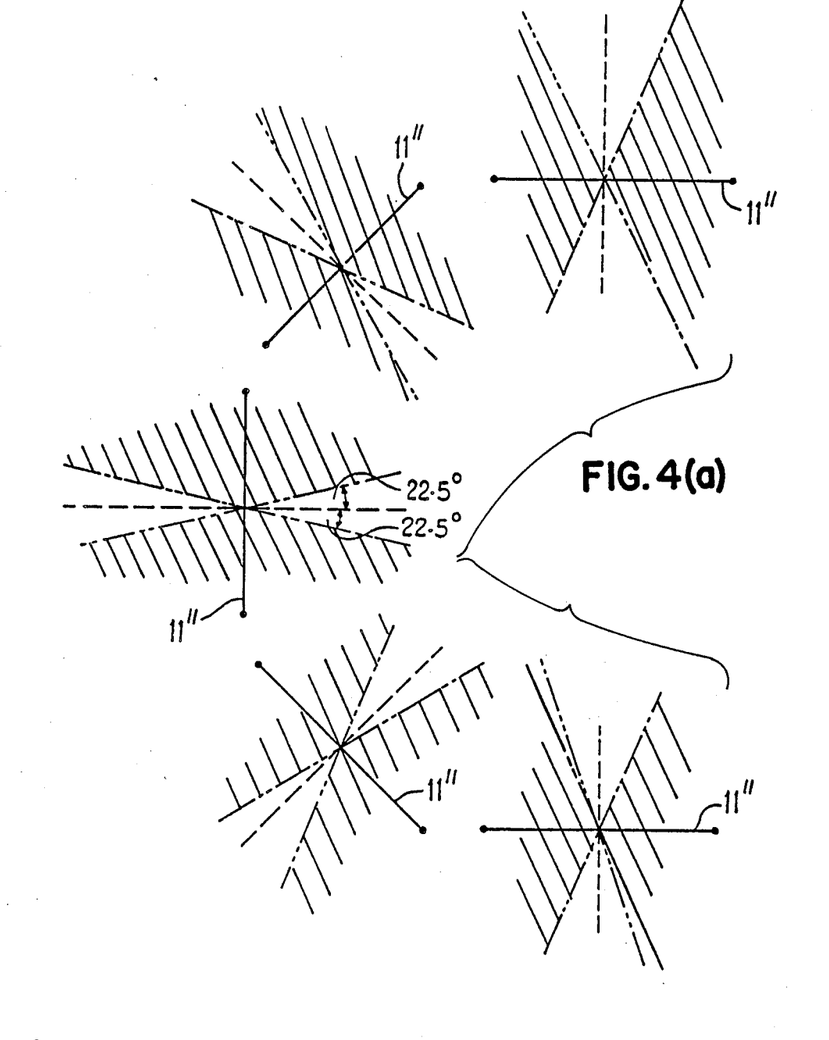

For example FIG. 4(a) shows four linear sub-arrays 11" each defining a range of angles for directional responses of ±22.5° to the normal of each. The arrays still comprise orthogonal pairs whose end-fire beams can be defined to reduce directional ambiguity in the other sub-array of the pair.

Figure 4B:
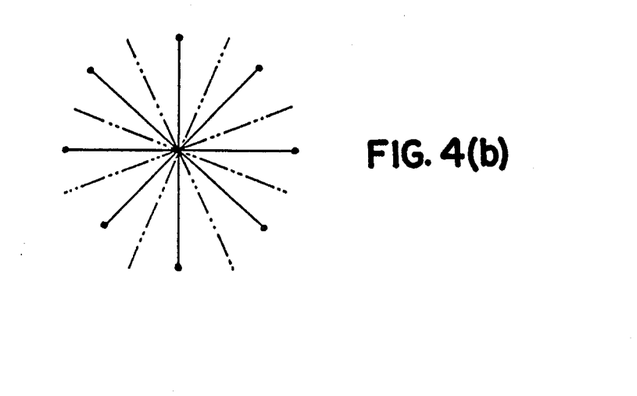

The sub-arrays may of course be superimposed as shown at 4(b) and any number of linear sub-array (not necessarily an even number in orthogonal pairs) may be used.

The angular ranges of each of the sub-arrays may differ and, depending upon the number and extent of identifiable directions required of the spectra formed, a single array may be employed to provide directional response beams (bearing in mind angular resolution and irregular steps) with only a simple end-fire array or other means to resolve directional ambiguity.

As stated above the measurement plane is conveniently and usefully defined in the azimuth plane for detecting sources as a function of direction with respect to the apparatus. However the measurement plane may be defined in other than azimuth, for example providing directionally related spectra for defined elevation angles in one or more azimuth directions by providing one of the linear sub-arrays with a vertically extending axis.

A third linear sub-array may be employed orthogonal to the sub-arrays 11 and 11' of FIG. 1 to provide spectra related both to azimuth direction and elevation angle.

We claim:

1. Apparatus for providing a plurality of acoustic power spectra, all defined over a predetermined frequency band from acoustic signals received in a predetermined time interval, for individually identifiable directions, comprising
   (i) an array of microphone elements fixedly disposed in relation to each other substantially in a measurement plane,
   (ii) sampling means operable to define a succession of sampling periods throughout the predetermined time interval and for each sampling period to sample the acoustic signals received by the array elements,
   (iii) array sample storage means having readable storage locations operable to store for each array element each signal sample and the samples of a plurality of immediately preceding sampling periods,
   (iv) directed beam forming means operable to define for each beam direction relative delays between array element signals characteristic of the reception beam direction in terms of the sampling period and storage locations at which the samples have been stored with the appropriate delays and for at least some of the sampling periods read the stored samples at locations corresponding to the relative delays associated with the beam directions and combine the read samples to give directed beam samples associated with the individual sampling periods for each of the beam directions,
   (v) directed beam sample storage means operable to store directed beam samples to form, for each beam direction, for sampling periods extending over at least a part of the predetermined interval a set of directed beam samples, and
   (vi) analysis means operable at the end of the predetermined interval to determine from each set of directed beam samples the acoustic power spectrum of the signals received from the direction associated with the set.

2. Apparatus as claimed in claim 1 in which the analysis means includes Fast Fourier Transform means operable to derive from each set of directed beam samples an acoustic power spectrum function, as a set of acoustic power function values each associated with a particular frequency of the band, associated with the beam direction for which the set is defined for the predetermined time interval.

3. Apparatus as claimed in claim 1 in which the directed beam sample storage means is operable to store a representation of each directed beam sample tagged in accordance with the position of the sample period in relation to the timing interval, the beam direction and the acoustic power.

4. Apparatus as claimed in claim 1 in which the analysis means is operable to analyse each of the sets of directed beam samples in sequence.

5. Apparatus as claimed in claim 1 in which said predetermined time interval is less than three seconds.

6. Apparatus as claimed in claim 1 in which the sampling means is operable to define a succession of predetermined time intervals and in which the analysis means is operable to analyse the sets of directed beam samples stored within one time interval before the end of a succeeding time interval.

7. Apparatus as claimed in claim 6 in which the predetermined time intervals are contiguous.

8. Apparatus as claimed in claim 6 in which the directed beam sample storage means is arranged to store directed beam samples formed in each timing interval at storage locations vacated by each set of directed beam samples taken by the analysis means in that timing interval.

9. Apparatus as claimed in claim 1 in which the array of microphone elements comprises a plurality of linear sub-arrays inclined at least one predetermined angle to each other in the measurement plane, each beam direction being defined in relation to the normal to a sub-array such that each beam direction extends on both sides of the sub-array with directional ambiguity and the sub-arrays being disposed in the measurement plane such that for each sub-array beam directions are defined which extend through an angular range, with respect to the normal, which is complementary to the angular range of each other sub-array to form in total beam directions, with said ambiguities, extending to include said individually identifiable directions on the measurement plane and are defined in both direction of end fire.

10. Apparatus as claimed in claim 9 in which there are a pair of linear sub-arrays.

11. Apparatus as claimed in claim 10 in which the pair of linear arrays are disposed orthogonally to each other and define beam directions within an angular range of 360° in the measurement plane.

12. Apparatus as claimed in claim 9 in which the centres of the arrays are disposed substantially coincidently.

13. Apparatus as claimed in claim 9 in which the array of microphone elements includes a linear array extending in a direction defining a plane inclined to the measurement plane.

14. Apparatus as claimed in claim 1 in which the microphone elements have omnidirectional response sensitivity in the measurement plane.

15. Apparatus as claimed in claim 1 in which the array sample storage means comprises, for each array element, random access memory having a storage location for each signal sample of that element stored and read/write means responsive to the sampling means to transfer contents between successively addressed locations for each sample taken and to hold the taken sample in the location having the first address of the sequence and the beam forming means is operable to define each beam direction as a group of addresses of memory locations associated with different array elements and to read the addresses of each of said groups in turn to derive the directed beam samples.

16. Apparatus as claimed in claim 1 in which
   (i) the array sample storage means comprises, for each array element sequential store and transfer means having an input storage stage and a plurality of sequential transfer storage stages, output terminals to at least some of the stages at which the stage contents can be read and clocking means responsive to the sampling means to transfer each of the stored samples to a subsequent stage and apply the taken sample to the input storage stage and
   (ii) the beam forming means comprises a switching matrix, combining means and memory, said switching matrix having a plurality of matrix switching nodes connected individually to said sequential transfer storage stages to receive the outputs thereof and connected, in common with others connected to the same sequential transfer storage means, to the combining means to deliver said outputs thereto and being responsive to a matrix addressing input signal for a particular beam direction to select a matrix node for each mode for each sequential transfer means to define the storage stages connected to the combining means for that beam direction, and said memory being operable to store matrix addressing input signals identifying each of said plurality of beam directions in terms of the matrix switching modes associated with the storage stage outputs to be combined and apply the addressing input signals to the matrix in sequence within each sampling period.

17. Apparatus as claimed in claim 1 in which the sampling means includes multiplexing means operable to supply samples of the array microphone element signals sequentially to the array sample storage means within each sampling period and amplitude shading means between the multiplexing and array sample storage means arranged to modify the value of each sample of the sequence applied thereto in accordance with a stored sequence of shading factors corresponding to the shading pattern for the element locations in the array addressed synchronously with the multiplexing means.

18. Acoustic emission detection apparatus arranged to detect the presence of predetermined acoustic emissions and identifying the direction thereof comprising apparatus as claimed in claim 1 arranged to produce said spectra with a frequency band including frequency components of a predetermined acoustic emission, processing means for examining each spectrum formed for each of said beam directions related to the normal of each array and responsive to the presence in the spectrum, associated with one beam direction relative to one linear array, of a frequency component indicative of said predetermined acoustic emission to indicate detection of the acoustic emission in the ambiguous beam direction defined with respect to the array and to compare the levels of said frequency component in the endfire spectra of the other linear array or arrays to resolve the ambiguity of said beam direction about said one array into a unique direction within the measurement plane.

19. A method of providing a plurality of acoustic power spectra, all defined over a predetermined frequency band from acoustic signals received in a predetermined time interval, for individually identifiable directions, comprising
   (a) disposing an array of microphone elements substantially in a measurement plane,
   (b) defining a succession of sampling periods throughout the predetermined time interval and for each sampling the acoustic signals received by the array elements,
   (c) storing each array element signal sample and the samples of a plurality of immediately preceding sampling periods,
   (d) defining for each beam direction relative delays between array element signals characteristic of the reception beam direction in terms of the sampling period and storage locations at which the samples have been stored with the appropriate delays and, for at least some of the sampling periods, combining stored samples read from locations corresponding to the relative delays associated with the beam directions to give directed beam samples for each of the beam directions, (e) storing directed beam samples to form, for each beam direction, for at least a part of the predetermined interval a set of directed beam samples and (f) at the end of the predetermined interval determining from each set of directed beam samples the acoustic power spectrum of the signals received from the direction associated with the set.

20. A method of detecting the presence of predetermined acoustic emissions and the direction thereof with respect to detection apparatus including an array of microphone elements arranged in a plurality of linear sub-arrays, the method comprising (i) disposing said plurality of linear sub-arrays inclined at at least one predetermined angle to each other in a measurement plane, (ii) defining in relation to the normals to the sub-arrays beam directions, extending on both sides of each sub-array with directional ambiguity, which extend through angular ranges complementary to the angular ranges of the others and form in total beam directions, with said ambiguities, extending to include all identifiable detection directions in the measurement plane and defining in relation to the axes of the sub-arrays end-fire beams, (iii) providing a plurality of acoustic power spectra, all defined over a predetermined frequency band from acoustic signals received in a predetermined time interval, for said identifiable detection directions by the method of claim 19.

(iv) examining each spectrum formed for each of said beam directions related to the normal of each array and (v) in response to the presence of a frequency component, indicative of detection of the acoustic emission in the ambiguous beam direction defined with respect to the sub-array, comparing the levels of said frequency component in the end-fire spectra of the other linear arrays to resolve the ambiguity of said beam direction about said one array into a unique direction within the measurement plane.

* * * * *